United States Patent [19]
Campbell

[11] Patent Number: 5,867,358
[45] Date of Patent: Feb. 2, 1999

[54] FAULT CURRENT LIMITING CIRCUIT

[75] Inventor: John S. Campbell, Mississauga, Canada

[73] Assignee: IPC Resistors, Inc., Canada

[21] Appl. No.: 842,186

[22] Filed: Apr. 23, 1997

[51] Int. Cl.⁶ .................................................. H02H 3/00
[52] U.S. Cl. ............................ 361/47; 361/58; 361/104
[58] Field of Search ................................. 361/42, 43, 47, 361/48, 58, 93, 103, 104

[56] References Cited

U.S. PATENT DOCUMENTS

| | | | |
|---|---|---|---|
| 1,378,557 | 5/1921 | Pragst. | |
| 1,865,409 | 6/1932 | Boehne. | |
| 2,149,683 | 3/1939 | Leyburn | 172/237 |
| 2,258,246 | 10/1941 | Hamilton | 175/294 |
| 2,920,164 | 1/1960 | Edsall | 200/114 |
| 4,580,186 | 4/1986 | Parker et al. | 361/42 |

*Primary Examiner*—Jeffrey Gaffin
*Assistant Examiner*—Michael J. Sherry
*Attorney, Agent, or Firm*—Cesari and McKenna, LLP

[57] ABSTRACT

A fault-current-limiting circuit for a poly-phase circuit of the type including a plurality of inductive windings each of which has a first terminal connected to a common point and at least one of the windings having a second terminal connected to an electrical load is disclosed. The fault-current-limiting circuit has a first electrical path between the common point and ground which includes a current-limiting device having a first state whereat current passes through the device and a second state whereat current through the device is limited and wherein the device switches from the first state to the second state when current through the device exceeds a predetermined maximum and a second electrical path between the common point and ground having an electrical resistance significantly greater than a resistance of the first path when a device is in its first state.

17 Claims, 5 Drawing Sheets

FAULT CURRENT LIMITING CIRCUIT

FIELD OF THE INVENTION:

The present invention relates to a fault current limiting circuit, and more particularly to a circuit for limiting fault current in a polyphase electric circuit.

BACKGROUND OF THE INVENTION

In modern electric power generation and distribution systems, polyphase alternating current is typically generated and distributed. A number of AC sources producing equal voltages at the same frequencies, at fixed but different phase angles provide the power. In an n-phase system, n voltage sources are connected together. Each voltage source produces a sinusoidally varying voltage of a fixed magnitude. The phase angle associated with each generated voltage varies from the phase angle associated with the voltage from another source by $2\pi/n$ radians. Current generated by each source may be provided to a single phase load, or to one phase of a polyphase load such as a polyphase motor or transformer.

Conveniently, the n voltage sources may be interconnected to each other at a common point. Modern power distribution systems are typically three phased. In a three-phase system, voltage sources and sinks connected at a common point are said to be connected in a "wye-configuration" or "star configuration". Alternatively, in a three-phased circuit, the voltage sources or sinks may be connected in "delta configuration".

While it is possible to interconnect multiple sources in a poly-phase system in a number of ways, the wye-configuration is generally desirable in three-phase systems. Specifically, for safety and other reasons, it is desirable to electrically connect the polyphase system to ground. Wye-connected source, provide a logical connection point for ground, namely the common (neutral) point of the n voltage sources.

Loads connected to an n-phase system may be chosen such that the net sum of the currents drawn from all sources or "phases" at any time, equals zero. For example, if currents drawn from each voltage source in an n-phase system are equal in magnitude, and displaced in phase by $2\pi/n$ radians, the phasor sum of the currents drawn from all sources is zero. In the above described wye-configuration, if the net sum of all currents drawn from the phases is zero, the polyphase circuit is said to be "balanced". Of course, if in an otherwise balanced system the current drawn from any of the sources varies, the system will no longer be balanced. Modern poly phase generation and distribution systems are designed and maintained in order to maintain a near balanced system.

In operation, however, a polyphase system is rarely perfectly balanced. While the loads may be chosen to balance the system, the demands on each phase often vary unpredictably with time. Each load may be subject to overvoltage, produced by surges impressed on the distribution system by way of lightning, switching, or the like. Similarly, a load may be prone to operate in resonance, thereby producing an overvoltage. Additionally, harmonics of the base operating frequency of the voltage sources may be present in the system. These harmonics may, for example, result from loads having non-linear voltage/current relationships, such as certain filters or rectifiers. Certain harmonics, such as the third harmonic of three voltage sources delivering current at a fixed (fundamental) frequency and displaced in phase by $2\pi/3$ radians, are no longer out of phase. For, example in a three-phase system, generated currents are $2\pi/3$ radians out of phase; third harmonics of these currents will have phase differences of $3*2\pi=2\pi=0$ radians. These harmonics are consequently zero phase harmonics; 6th, 9th, 12th and 15th harmonics will similarly be zero phase harmonics in a three phased system. As currents attributable to their harmonics are in phase, their phasor sum will not equal zero.

The difficulties associated with the overvoltage of loads and zero phase harmonics may be limited by directly grounding the common point of the wye-connected three phase circuit. Thus, in balanced operation, no current will flow from this common point to ground, as this common point remains at or near zero potential in view of the balanced loads. In the event of an overvoltage, the potential difference between this grounded common point and an affected load will be limited to the overvoltage of that load. No other phase of the n-phased load or single phase load will be affected by overvoltage in one of the loads.

On the other hand, in a situation where one of the loads suffers a fault, caused by, for example, machine failure, an excess amount of current is drawn by a single phase of the circuit. This excess current drawn may impact on the current provided to loads by the remaining phases in the circuit. If the common point of the circuit is connected to ground, much of the fault current will flow from or to this ground connection. Similarly, currents attributable to zero phase harmonics will similarly flow from or to this ground connection. However, if the common point of the circuit is directly grounded, as described above, the amount of fault current flowing from ground through the common point to the load is not limited.

One suggested compromise to grounding the common point of the polyphase circuit has been to connect this common point to ground through an electrical impedance. Thus in the event of failure, the current drawn through the common point will be limited by the impedance. The impedance may take the form of an inductive, reactive or resistive load. The insertion of such an impedance may however create other problems, as for example described in U.S. Pat. No. 1,378,577. If the impedance is reactive it may interfere with the proper functioning of electrical equipment connected to the transformer. If the impedance is purely resistive, resistive losses will occur any time the polyphase circuit in not perfectly balanced. As balancing of a polyphase circuit is typically imperfect, the use of a resistive connection between the common point and ground may be the source of significant losses over time.

The present invention attempts to overcome some of the disadvantages of known circuits used to limit fault current in a polyphase circuit.

SUMMARY OF THE INVENTION

In accordance with an aspect of the invention there is provided, a fault-current-limiting circuit to be used in combination with a poly-phase circuit, the poly-phase circuit comprising: a plurality of inductive windings; each of the windings having a first terminal connected to a common point; at least one of the windings having a second terminal connected to an electrical load; the fault-current-limiting circuit comprising: a first electrical path between the common point and ground comprising: a current-limiting device having a first state whereat current passes through the device; and a second state whereat current substantially does not pass through the device and wherein the device switches from the first state to the second state when current through the device exceeds a pre-determined maximum; a second electrical path between the common point and ground having an electrical resistance significantly greater than a resistance of the first path when the device is in the first state.

In accordance with another aspect of the invention there is provided, a fault-current-limiting circuit to be used in combination with a poly-phase circuit, the poly-phase circuit comprising: a plurality of inductive windings; each of the windings having a first terminal connected to a common point; at least one of the windings having a second terminal connected to an electrical load; the fault-current-limiting circuit comprising: first electrical connection means between the common point and the ground point; the first electrical connection means comprising an actuatable current-limiting means having a first and second state wherein current passes through the current limiting means in the first state and wherein current does not pass through the current limiting means in the second state; actuating means to switch the current limiting means from the first state to the second state when current through the current switching means exceeds a pre-determined maximum; second electrical connection means between the common point and the ground point having an electrical impedance significantly greater than an electrical impedance of the first electrical connection means when the current-limiting means is in the first state.

BRIEF DESCRIPTION OF THE DRAWINGS

In the figures which illustrate, by way of example, embodiments of the present invention.

DETAILED DESCRIPTION OF THE PREFERRED EMBODIMENTS

Figure 1:
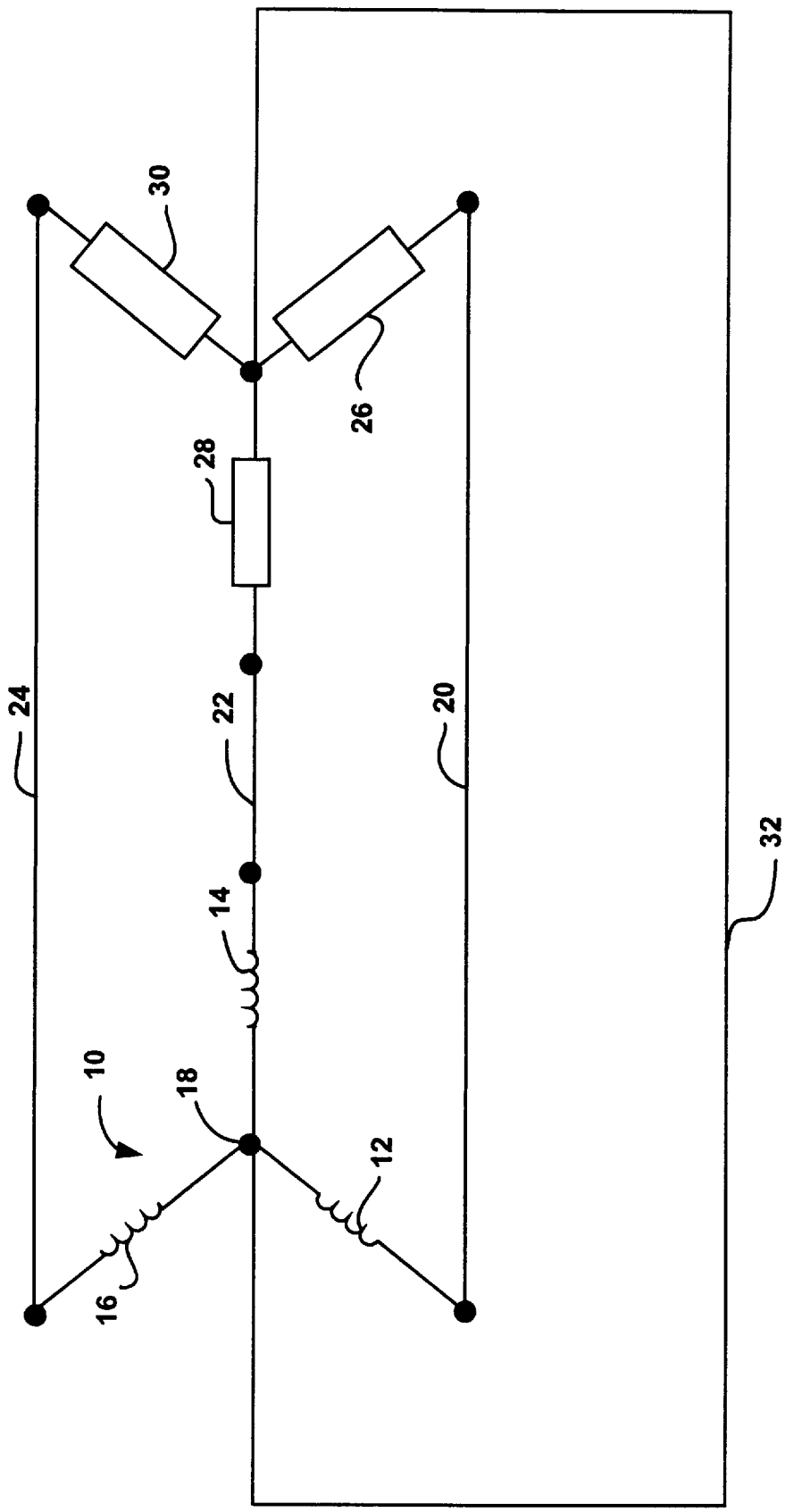
FIG. 1 is a schematic diagram of a three phase circuit (prior art)

FIG. 1 schematically illustrates the secondary side of a wye-connected poly (three) phase transformer 10. Transformer 10 comprises three inductive secondary windings 12, 14 and 16 connected at one end to a common point 18. The other end of each secondary winding 12, 14 and 16 is connected to electric transmission lines 20, 22, and 24, each of which is ultimately connected to an electrical load 26, 28, and 30 or to a portion of a three phase load (not shown). Current return path 32 is provided to complete the circuit. Alternatively, loads 26, 28 and 30 could be interconnected in delta configuration, this eliminates the need for return path 32. Additionally, for safety reasons, loads 26, 28, and 30 are typically further connected to ground (connection not shown). This ground connection is usually a casing connection or the like and under normal operation does not serve as a current path to or from each load.

Figure 2:
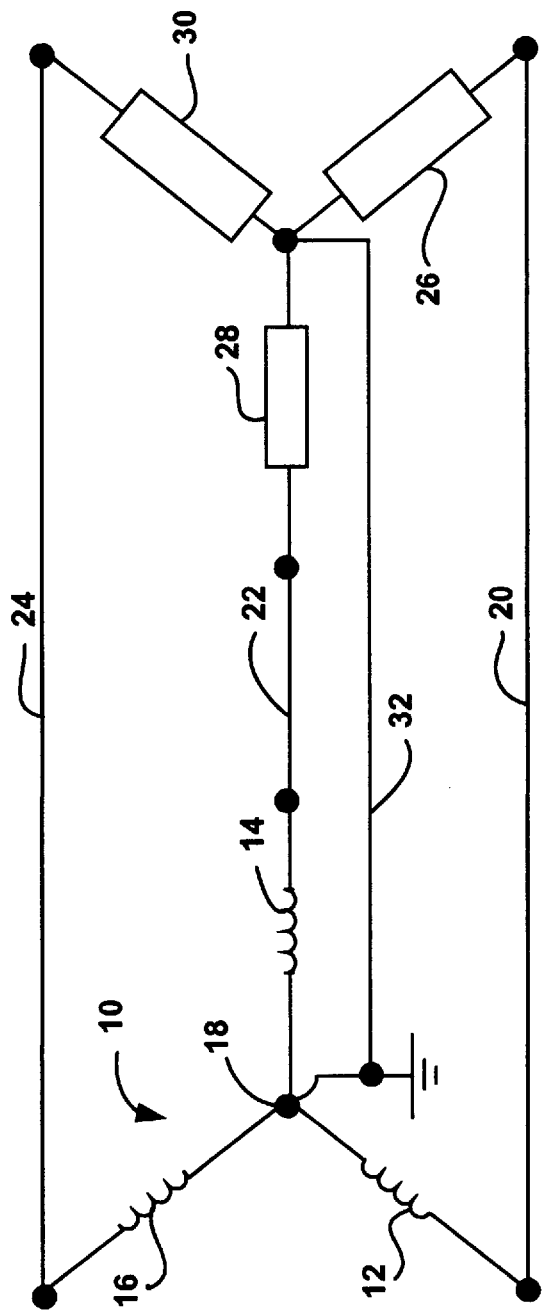
FIG. 2 is a schematic diagram of a three phase circuit having a grounded common point (prior art)

FIG. 2 schematically illustrates the secondary side of a wye-connected three phase transformer 10 as illustrated in FIG. 1 but with common point 18 connected directly to ground. Each load 26, 28 and 30 is connected between transmission lines 20, 22 and 24 and current return path 32, which is effectively grounded. In practice, return path 32 need not lead to proximate transformer 10. A return path may be provided directly or indirectly by grounding the common point of loads 26, 28 and 30.

The configuration of FIG. 2 limits the voltage potential across windings 12, 14 and 16 to the potential of loads 26, 28 and 30, thereby limiting the effects of overvoltage across windings 12, 14 and 16. In normal "balanced" operation, no current will flow through return path 32. However, in the event that any of the loads suffers a fault, the ground fault current provided to such load through common point 18 is unlimited.

Figure 3:
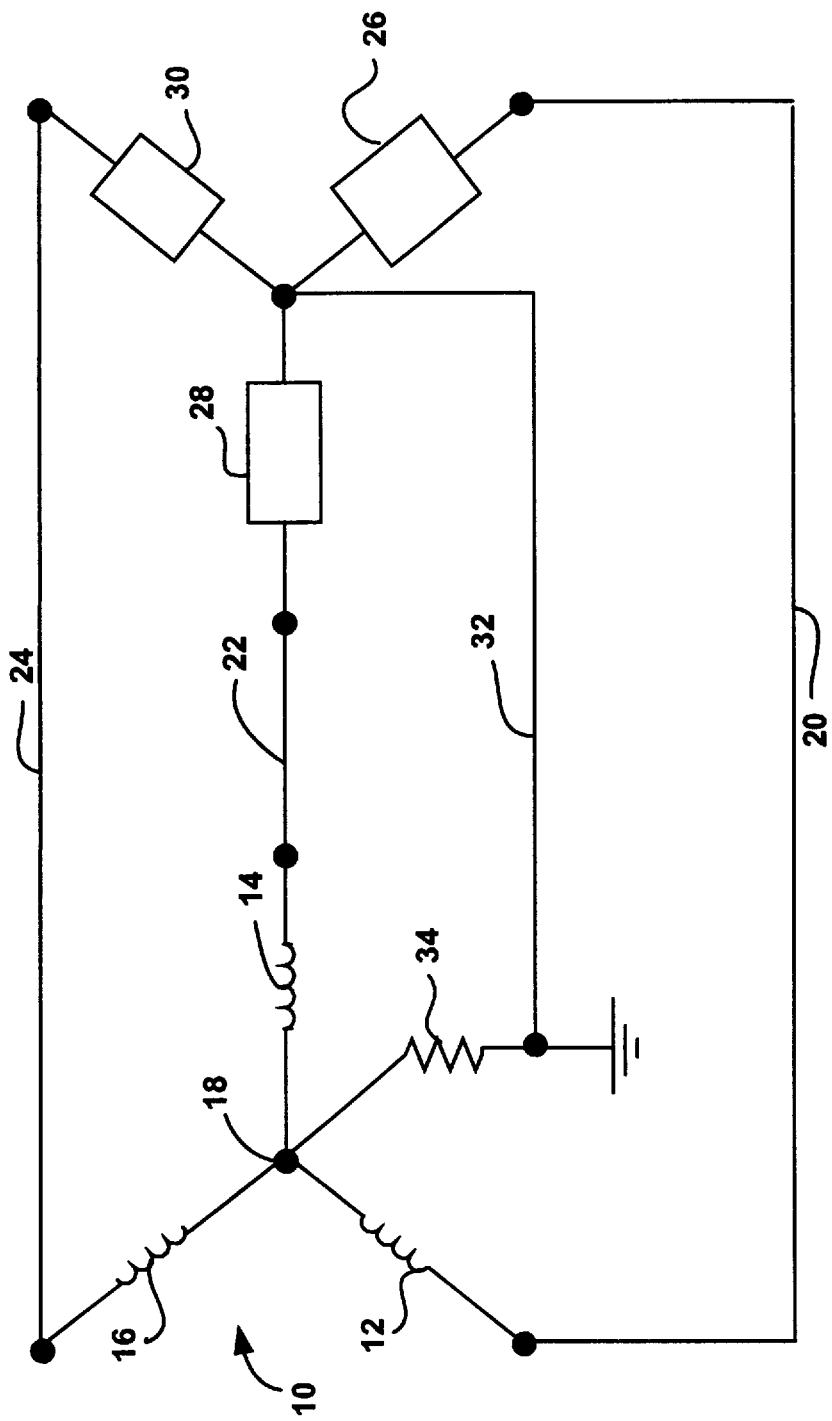
FIG. 3 is a schematic diagram of a three phase circuit comprising a resistor connected between a common point and ground to limit fault currents.

FIG. 3 illustrates the secondary side of a three phase transformer 10 in wye-configuration, as illustrated in FIG. 2. However, common point 18 is connected to ground by means of resistive element 34. In normal operation, if the system comprised of the circuit of FIG. 3 is "balanced" no current flows through return path 32 and resistor 34. However, if the system is not perfectly "balanced", imbalances in the system result in ohmic losses through resistor 34. This configuration limits, as does the configuration of FIG. 2, the voltage potential across windings 12, 14 and 16, thereby limiting the effects of overvoltage across winding 12, 14 and 16 caused by resonant overvoltage of the loads, or by electrical surges. In the event that any of the loads suffer a fault, the ground fault current provided to the load through common point 18 is dependent on and limited by the resistance of the circuit formed from the fault to ground through resistor 34.

FIG. 4, again schematically depicts the secondary side of a three phase transformer 10. However, common point 18 is connected to ground by means of a fault current limiting circuit 36, in accordance with an aspect of this invention. Fault current limiting circuit 36 provides two current paths 38, 40 between common point 18 and ground. Path 38 comprises an impedance, such as a resistor 42 connected at one end to ground and at the other to the common point 18 of three phase transformer 10. Path 40, comprises a current limiting device 44 such as a fuse or circuit breaker, connected in parallel with resistor 42, between common point 18 and ground. The value and nature of the impedance comprised of resistor 42 is chosen depending on the nature of the system comprised of the circuit of FIG. 4. Typically, the impedance is a conventional ohmic power resistor. Current limiting device 44, may be a current interrupter such as a fuse or circuit breaker or any other device which passes current in a first state and severely impedes the flow of current in a second state. The device 44 switches from the first state to the second state when the current through the device exceeds some minimum threshold. This minimum threshold is selectable and will vary from system to system.

Figure 4:
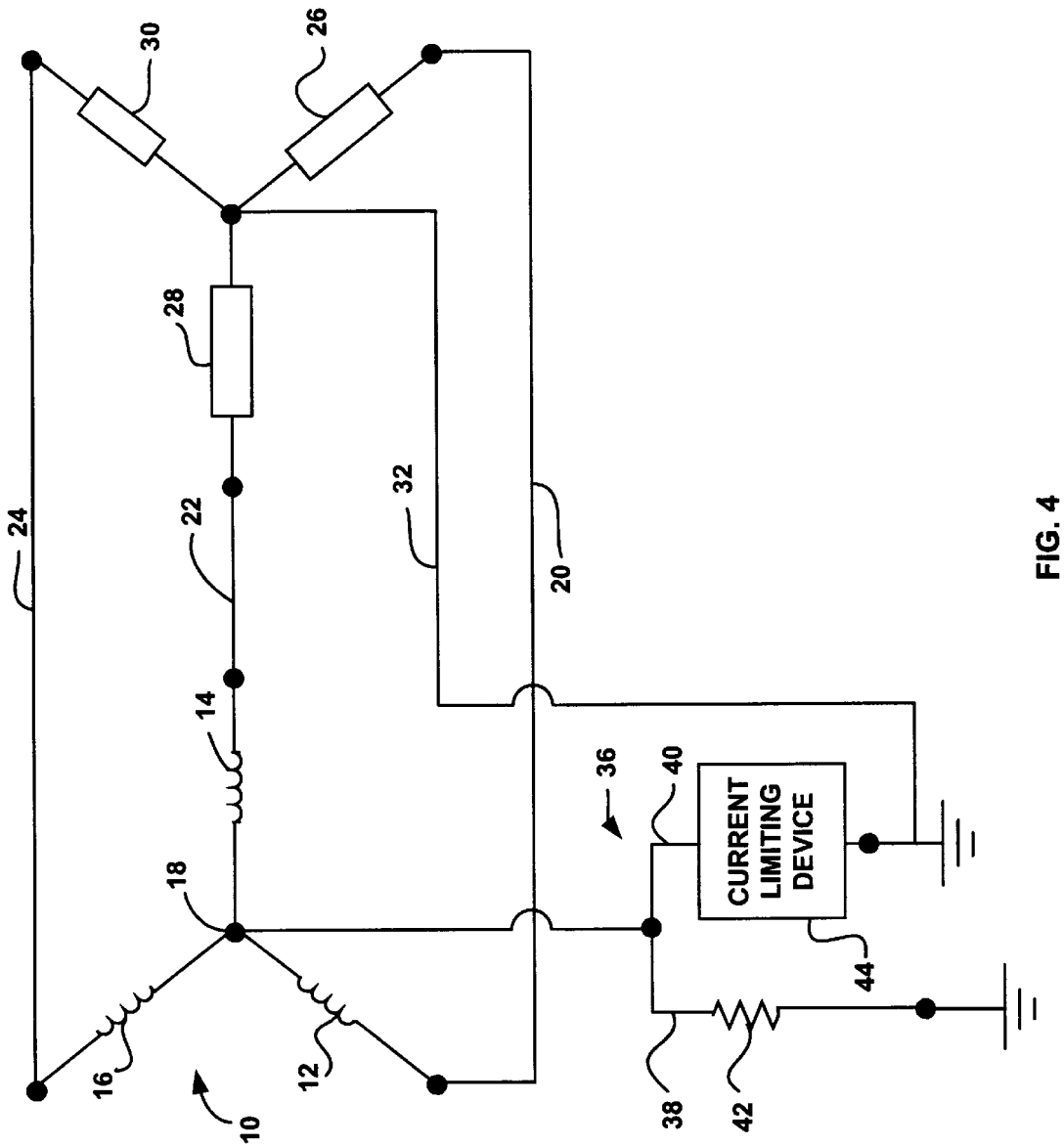
FIG. 4 is a schematic diagram of a three phase circuit and a fault current limiting circuit, in accordance with an aspect of the present invention.

In operation, a potential is applied to the primary windings (not shown) of the transformer 10 of FIG. 4. This, in turn, induces a potential across the secondary windings 12, 14, 16 of transformer 10 which in turn produces a current flow in lines 20, 22, and 24 to provide current to loads 26, 28 and 30. Loads 26, 28 and 30 are connected to return path 32 so that current supplied by each phase through each load 26, 28, and 30 returns through path 32. Ideally, loads 26, 28 and 30 are balanced so that the sum of the currents from each phase equals zero. As a result, if the loads are balanced the net current returning through loads 26, 28 and 30 through return path 32 is zero. This accordingly also results in zero net current flow from ground through current limiting circuit 36 through common point 18. Hence the potential of common point 18, equals ground potential. Similarly, the electric potential across and current through resistor 42 and current limiting device 44 is zero.

Practically, however, loads 26, 28 and 30 are not perfectly balanced. As noted above this imbalance may for example be caused by varying demands of the loads, surges or, zero phase harmonics. The net current returning through return path 32 from loads 26, 28 and 30 is consequently non-zero. As such, absent a connection to ground, node 18 would not be at ground potential. In the presence of the connection to ground through current limiting circuit 36, in normal operation, path 40 provides a low impedance path from node 18 to ground because current limiting device 44 is in its first state, as a near short circuit. Thus, this imbalance results in a flow of current through common point 18 to or from ground.

Current limiting device 44 is further selected so that it is triggered or activated to switch from its first state whereat the device 44 passes current to a second state whereat the device 44 limits the flow of current. This trigger point is typically pre-selected, and chosen as a fraction of the balanced load current delivered through each winding 12, 14 and 16. The trigger point may, for example, be chosen as 10–15% of the balanced load current to or from each load. If current through path 40 exceeds this threshold, this is a fair indication that the current flowing from or to ground through common point 18 is actually caused by a fault, rather than a normal operating imbalance.

Accordingly, in the event that the current through ground point 18 exceeds this threshold, current limiting device 44 switches from its first state to the second state. If current limiting device 44 is a fuse, the fuse blows; if current limiting device 44 is a circuit breaker, it is tripped. When current limiting device 44 is in the second state, current flowing from ground through common point 18 flows through resistor 42, which now provides a current path having a lower impedance than path 40 from node 18 to ground.

In the presence of an open circuit in path 40 of the current limiting circuit, resistor 42 also limits the current flowing from ground through common point 18, by increasing the impedance of the overall fault circuit.

Figure 5:
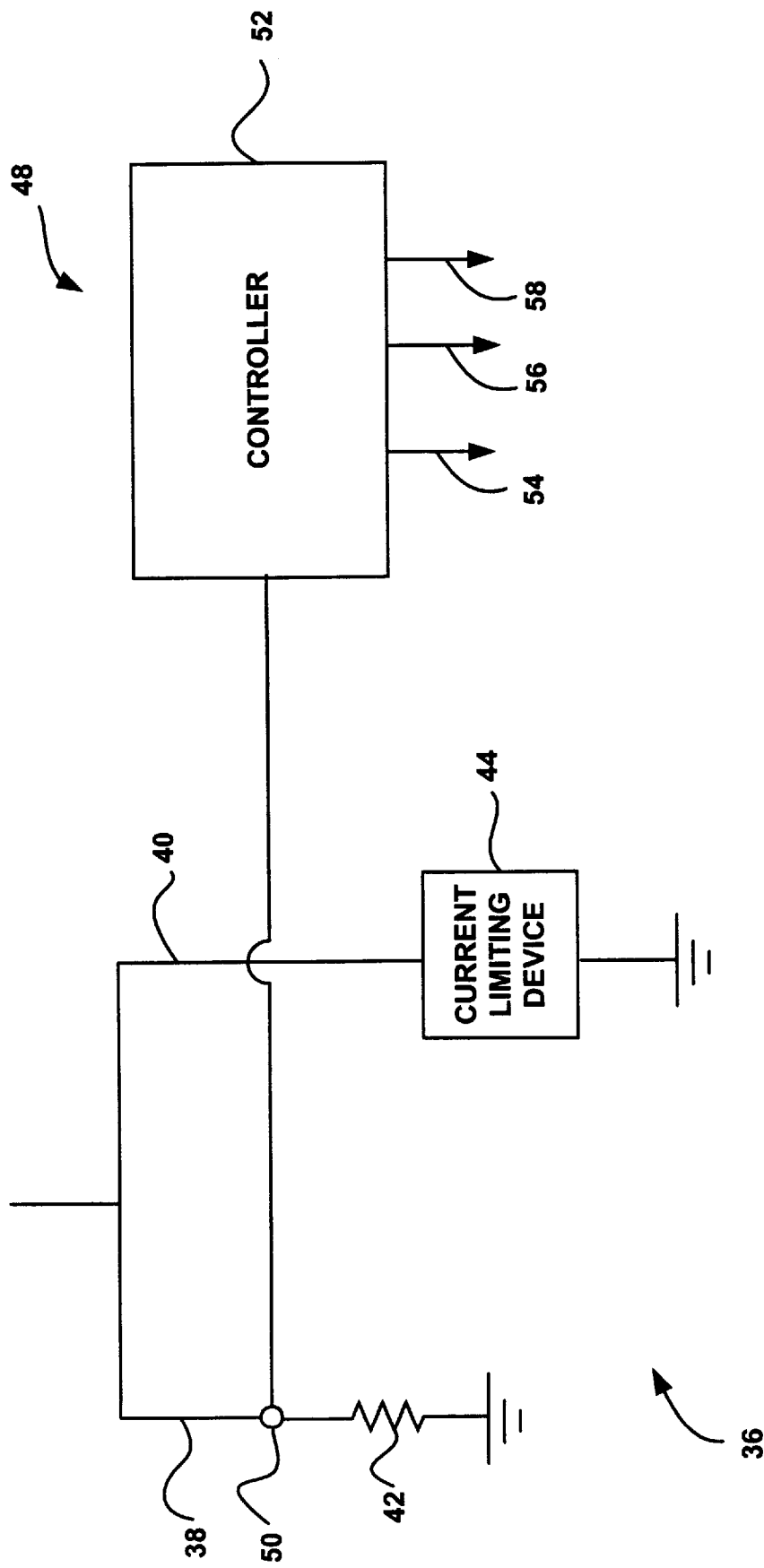
FIG. 5 is a schematic diagram of a fault current limiting circuit, in accordance with another aspect of this invention.

Additionally, an alarm system 48 or other protection system as shown in FIG. 5 may be connected in communication with the current limiting circuit 36 in order to activate an alarm or limit power provided to the system. As this current limiting circuit 36 may ideally be installed in a previously existing power system which was previously directly grounded (as shown in FIG. 2) at node 18, an alarm system is highly desirable for providing an indication that the system is no longer directly grounded. Alarm system 48 comprises current sensor 50 in electrical communication with controller 52. Sensor 50 senses the magnitude of the current flowing through path 38, and hence the current through resistor 42. If the current sensed by sensor 50 exceeds some minimal threshold, controller 52 may interpret this as an indication that path 38 is a lower impedance path than path 40. This would indicate that current limiting device 44 has assumed its second state. In response, controller 52 may signal the presence of a fault to a further device or devices interconnected to controller 52 at outputs 54, 56 and 58. For example, controller 52 may trigger an audible or visual alarm, or otherwise notify an operator of a fault by means of a notification device (not shown) connected to outputs 52, 54, or 56. Alternatively, controller 52 may be in communication with a computer, or a control system which controls the provision of power to/by transformer 10. This computer or controller 52 might also control loads 26, 28 and 30 and adjust the system to compensate for the fault. If necessary the detection of an alarm may cause a shutdown of the provision of power to the system, thus limiting further flow of fault current. It will be understood that the presence of a fault need not be detected by monitoring current through path 38, but may be detected by monitoring current through limiting device 44, or simply the state of current limiting device 44. The state of the current limiting device 44 may be sensed directly or indirectly by measuring the potential across the device 44.

Once a fault has been detected, the fault should be remedied and current limiting device 44 should be returned to its first state by replacing device 44 (for example in the case of a fuse) or resetting device 44 (in the case of a circuit breaker).

A person skilled in the art will appreciate that numerous modifications to the described embodiment are possible. For example, the described windings are those of the secondary of a three phase transformer. These windings could instead be those of generators or a three phase generator. Loads 26, 28 and 30 could be connected in delta configuration. Similarly, current limiting device 44 need not be a circuit breaker or fuse, but may comprise a solid-state current interrupting device. The impedance of path 38 need not result from a resistor but may be result from an inductive or reactive load. Additionally, current limiting device 44 and the impedance of path 38 need not be connected directly in parallel to each other.

It will be understood that the invention is not limited to the illustrations described herein which are merely illustrative of a preferred embodiment of carrying out the invention, and which are susceptible to modification of form, size, arrangement of parts and details of operation. The invention, rather, is intended to encompass all such modification within its spirit and scope, as defined by the claims.

I claim:

1. A fault-current-limiting circuit to be used in combination with a poly-phase circuit, said poly-phase circuit comprising:
    a plurality of inductive windings;
       each of said windings having a first terminal connected to a common point;
       at least one of said windings having a second terminal connected to an electrical load;
    said fault-current-limiting circuit comprising:
       a first electrical path between said common point and ground comprising:
          a current-limiting device having a first state whereat current passes through said device; and a second state whereat current substantially does not pass through said device and wherein said device switches from said first state to said second state when current through said device exceeds a pre-determined maximum;
       a second electrical path between said common point and ground having an electrical resistance significantly greater than a resistance of said first path when said device is in said first state.

2. The fault-current-limiting circuit of claim 1, wherein said current-limiting device is one of a fuse and a circuit breaker.

3. The fault-current-limiting circuit of claim 2, wherein said one of said fuse and said circuit breaker is connected to said common point and ground.

4. The fault-current-limiting circuit of claim 3, wherein said second electrical path comprises a resistor connected in parallel with said one of said fuse and said circuit breaker.

5. The fault-current-limiting device as claimed in claim 3, wherein said pre-determined maximum current is chosen a percentage of steady-state load current.

6. The fault-current-limiting circuit of claim 4, wherein said poly-phase circuit is a three-phased circuit.

7. The fault-current-limiting circuit of claim 5, wherein said pre-determined maximum current is at least ten percent of a steady-state load current passing through one of said windings.

8. A fault-current-limiting circuit to be used in combination with a poly-phase circuit, said poly-phase circuit comprising:

a plurality of inductive windings;
   each of said windings having a first terminal connected to a common point;
   at least one of said windings having a second terminal connected to an electrical load;
said fault-current-limiting circuit comprising;
   first electrical connection means between said common point and a ground point;
   said first electrical connection means comprising
      an actuatable current-limiting means having a first and second state
      wherein current passes through said current limiting means in said first state and wherein current does not pass through said current limiting means in said second state;
      wherein said current limiting means switches from said first state to said second state when current through said current limiting means exceeds a pre-determined maximum;
   said electrical connection means between said common point and ground having an electrical impedance significantly greater than an electrical impedance of said first electrical connection means when said current-limiting means is in said first state.

9. The fault-current-limiting circuit of claim 8, wherein said polyphase circuit is a three-phased circuit.

10. The fault-current-limiting circuit of claim 9, wherein said current limiting means comprise one of a fuse and a circuit breaker.

11. The fault-current-limiting circuit of claim 10, wherein said second electrical connection means comprises a resistor connected to said common point and ground.

12. The fault-current-limiting circuit of claim 11, wherein said one of said fuse and said circuit breaker is connected in parallel with said resistor.

13. The fault-current-limiting circuit of claim 12 wherein said pre-determined maximum is a current in excess of ten percent of steady-state current through one of said windings.

14. The fault-current-limiting circuit of claim 1, further comprising an alarm in communication with one of said first and second path, adapted to sense when said current limiting device is in said second state and generate a signal when said current limiting device is in said second state.

15. The fault-current-limiting circuit of claim 14, wherein said signal is one of an audible and visual signal.

16. The fault-current-limiting circuit of claim 8 further comprising an alarm in communication with one of said first and second electrical connection means, adapted to sense when said current limiting means is in said second state and generate a signal when said current limiting device is in said second state.

17. The fault-current-limiting circuit of claim 16, wherein said signal is one of an audible and visual signal.

* * * * *

UNITED STATES PATENT AND TRADEMARK OFFICE
CERTIFICATE OF CORRECTION

PATENT NO. : 5,867,358
DATED : February 2, 1999
INVENTOR(S) : John S. Campbell

It is certified that error appears in the above-identified patent and that said Letters Patent is hereby corrected as shown below:

At column 7, claim 8, line 30, change "said" to --second--.

Signed and Sealed this

Eighth Day of June, 1999

Q. TODD DICKINSON

John F. McKenna, Esq.  *Attest:*
CESARI AND MCKENNA, LLP
30 Rowes Wharf
Boston, MA 02110

*Attesting Officer*  Acting Commissioner of Patents and Trademarks